(12) United States Patent
Vantrease et al.

(10) Patent No.: US 11,865,764 B2
(45) Date of Patent: Jan. 9, 2024

(54) THERMOFORMING MACHINE HAVING TOGGLE DIFFERENTIAL LOAD MECHANISM AND METHOD

(71) Applicant: Irwin Research and Development, Inc., Yakima, WA (US)

(72) Inventors: Dale L. Vantrease, Naches, WA (US); Jere F. Irwin, Yakima, WA (US)

(73) Assignee: Irwin Research and Development, Inc., Yakima, WA (US)

( * ) Notice: Subject to any disclaimer, the term of this patent is extended or adjusted under 35 U.S.C. 154(b) by 907 days.

(21) Appl. No.: 16/215,364

(22) Filed: Dec. 10, 2018

(65) Prior Publication Data

US 2019/0329479 A1 Oct. 31, 2019

Related U.S. Application Data

(60) Provisional application No. 62/667,322, filed on May 4, 2018, provisional application No. 62/663,178, filed on Apr. 26, 2018, provisional application No. 62/662,689, filed on Apr. 25, 2018.

(51) Int. Cl.
| | |
|---|---|
| *B29C 51/08* | (2006.01) |
| *B29C 51/46* | (2006.01) |
| *B29C 51/20* | (2006.01) |
| *B29C 51/38* | (2006.01) |

(52) U.S. Cl.
CPC ............ *B29C 51/082* (2013.01); *B29C 51/20* (2013.01); *B29C 51/38* (2013.01); *B29C 51/46* (2013.01)

(58) Field of Classification Search
CPC ....... B29C 51/20; B29C 51/082; B29C 51/38; B29C 51/46
See application file for complete search history.

(56) References Cited

U.S. PATENT DOCUMENTS

| | | | |
|---|---|---|---|
| 3,677,675 A | 7/1972 | Brown | |
| 4,878,826 A | 11/1989 | Wendt | |
| 5,002,479 A | 3/1991 | Brown | |
| 5,385,465 A | 1/1995 | Greiwe et al. | |

(Continued)

FOREIGN PATENT DOCUMENTS

DE 2900901 7/1980
WO PCT/US2019/028181 8/2019

*Primary Examiner* — Monica A Huson
*Assistant Examiner* — Kelsey C Grace
(74) *Attorney, Agent, or Firm* — Keith D. Grzelak; Wells St. John P.S.

(57) ABSTRACT

A thermoforming apparatus is provided having a frame, a pair of platens, and a platen drive assembly. The platens are carried by the frame on opposite sides of a sheet line each configured to carry a respective die. One platen has a proximal die surface adjacent the sheet line and a rear surface distal the sheet line. The platen drive assembly is interposed between the frame and the one platen and has at least one reciprocating kinematic linkage and a drive motor configured to reciprocate the one platen to and fro relative to another platen. The kinematic linkage has a plurality of links interconnected pivotally together with respective rotation joints and interposed between the frame and the one platen. An outboard-most rotation joint is provided proximate one end of the frame and an inboard-most rotation joint intermediate the rear surface and the proximal die surface. A method is also provided.

17 Claims, 16 Drawing Sheets

(56) References Cited

U.S. PATENT DOCUMENTS

| | | |
|---|---|---|
| 6,055,904 A | 5/2000 | Chun et al. |
| 8,356,990 B2 | 1/2013 | Keeley |
| 8,790,108 B2 | 7/2014 | Lakatos |
| 2003/0090041 A1 | 5/2003 | Nemeskeri |
| 2004/0250709 A1 | 2/2004 | Schlepp |
| 2013/0049242 A1* | 2/2013 | Vantrease ............... B29C 51/38 264/39 |
| 2013/0119584 A1 | 5/2013 | Irwin |
| 2017/0080629 A1 | 3/2017 | Irwin |

* cited by examiner

THERMOFORMING MACHINE HAVING TOGGLE DIFFERENTIAL LOAD MECHANISM AND METHOD

CROSS REFERENCE TO RELATED APPLICATION

This application claims priority to U.S. Provisional Patent Application Ser. No. 62/667,322 which was filed on May 4, 2018, the entirety of which is incorporated by reference herein. This application also claims priority to U.S. Provisional Patent Application Ser. No. 62/663,178, which was filed on Apr. 26, 2018, the entirety of which is incorporated by reference herein. This application also claims priority to U.S. Provisional Patent Application Ser. No. 62/662,689, which was filed on Apr. 25, 2018, the entirety of which is incorporated by reference herein.

TECHNICAL FIELD

The disclosure pertains generally to thermoforming apparatus. More particularly, this disclosure relates to thermoforming machines having a large forming loads configured with adjustable or relocatable load paths that enable maximization of flatness for contract surfaces of die plates affixed to respective platens

BACKGROUND OF THE DISCLOSURE

The use of large tonnage thermoforming frames and drive mechanisms is known where pneumatic pressure is being applied to a heated sheet of thermoformable material during an article forming operation. Where large arrays of articles are provided on die plates on a platen, the surface area subject to pneumatic pressure and/or vacuum generates very large loads on the kinematic drive linkages and frame of a thermoforming machine. Improvements are needed in order to enable forming using very large loads without requiring further increases in the size and strength of traditional frames and linkages of a thermoforming machine while mitigating forming problems resulting from elastic deformation of thermoforming machine components, particularly when forming newer plastic sheet materials and/or article geometries that require greater forming pressures and loads. Furthermore, there is a need to impart precision control on rim formation of thermoformed articles during a forming operation.

One problem caused by large forming loads, such as pneumatic and vacuum forming loads between die plates is tooling surface deformation that causes the contact surfaces of adjacent die plates to deform or flex in waves, caused by the discrete loads paths used to hold the dies in position during forming. Secondly, when different sized and shaped die plates are added to a platen, these loads paths are in different locations relative to the overall surface area being loaded during a forming operation. This results in different deformation modes and shapes being imparted to the new die plates. There exists a need to adjust the load path positions as die plates are changed out between different sets of die plates in order to maximize flatness of the contact surfaces between co-acting die plates during forming operations.

Other aspects and implementations are contemplated.

SUMMARY OF THE INVENTION

A thermoforming machine is provided with a frame and opposed platens that maximizes shut height of die platens inserted between the platens for a given overall height of the machine and frame. Indirectly, this also results in a maximum fully open height between the platens for a given frame height, or dimension transverse to a sheet line. The thermoforming machine also has adjustable length drive arms for each platen to enable alignment of inserted die plates.

According to one aspect, a thermoforming apparatus is provided having a frame, a pair of platens, and a platen drive assembly. The frame encompasses a sheet line. The platens are carried by the frame on opposite sides of the sheet line each configured to carry a respective die. One platen has a proximal die surface adjacent the sheet line and a rear surface distal the sheet line. The platen drive assembly is interposed between the frame and the one platen and has at least one reciprocating kinematic linkage and a drive motor configured to reciprocate the one platen to and fro relative to another platen. The kinematic linkage has a plurality of links interconnected pivotally together with respective rotation joints and interposed between the frame and the one platen. An outboard-most rotation joint is provided proximate one end of the frame and an inboard-most rotation joint is provided intermediate the rear surface and the proximal die surface.

According to another aspect, a thermoforming apparatus is provide having a frame, a pair of opposed platens, and a platen drive assembly. The frame has opposed ends disposed on opposite sides of a sheet line. The pair of opposed platens is carried by the frame each configured to carry a die. One die is configured to engage an opposed face of another die across a heated sheet of thermoformable material provided on the sheet line. One platen has a front die surface proximate the sheet line and a rear surface proximate the terminal end. The platen drive assembly is interposed between the frame and the one platen to reciprocate the one platen toward and away from another platen and has at least one reciprocating kinematic linkage and a drive motor. The kinematic linkage has a plurality of links interconnected pivotally together with respective rotation joints and interposed between the frame and the one platen. An outboard-most rotation joint is provided proximate one end of the frame and an inboard-most rotation joint is provided inboard of the rear surface and proximate the front die surface.

According to yet another aspect, a method is provided for maximizing die clearance between platens for a given height thermoforming frame. The method includes: providing a frame, a drive assembly, a kinematic linkage, and a pair of opposed platens, at least one of the platens is supported for reciprocation by the frame toward and away from another of the platens; supporting an outboard-most end of the kinematic linkage proximate one end of the frame via an outboard-most rotation joint; and driving the at least one platen with the kinematic linkage pivotally affixed to the one platen at an inboard-most rotation joint inboard of a rear surface and proximate a front die surface of the one platen from a closed position to a maximally open position.

According to even another aspect, a thermoforming apparatus is provided having a pair of opposed platens and a platen drive assembly. The pair of opposed platens is carried by the frame each with a die. One die is configured to engage an opposed face of another die across a heated web of thermoformable material. The platen drive assembly is interposed between the frame and each platen. Each of the drive assemblies has a drive motor and a toggle linkage having a pair of toggle shafts carried in the frame and drive arms. Each toggle shaft is carried by the frame outboard of a distal end of each of the drive arms on the respective platen relative to the web travel path.

BRIEF DESCRIPTION OF THE DRAWINGS

Exemplary embodiments of the various disclosures are described below with reference to the following accompanying drawings. The drawings may be considered to represent scale.

DETAILED DESCRIPTION OF THE EMBODIMENTS

This disclosure is submitted in furtherance of the constitutional purposes of the U.S. Patent Laws "to promote the progress of science and useful arts" (Article 1, Section 8).

Figure 1:
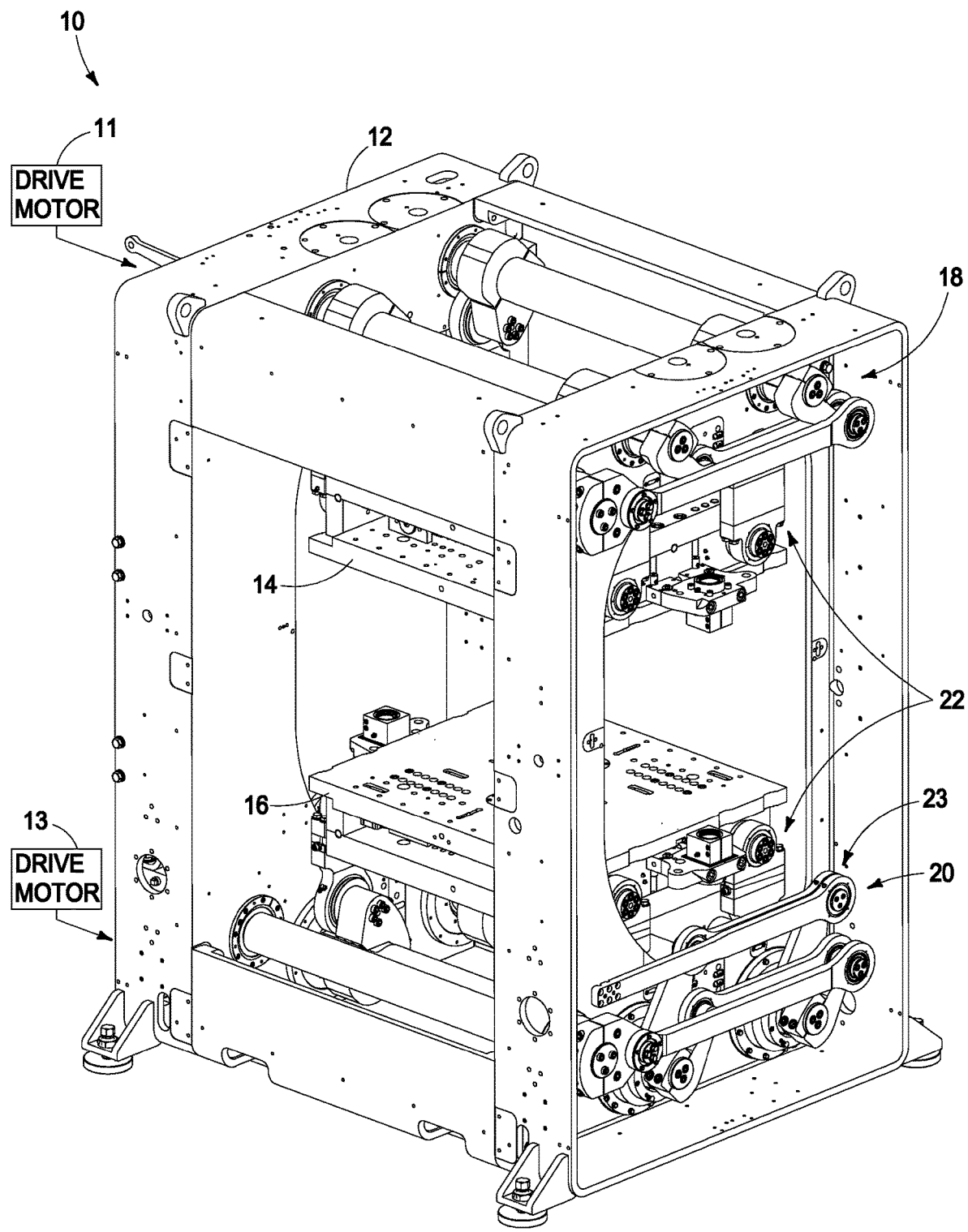
FIG. 1 is a right downstream end perspective view from above of a thermoforming machine having a differential load source with a Servo Actuated Shut Height (SASH) and platens having tooling support plates with discrete load paths.

FIG. 1 illustrates one suitable construction for a thermoforming machine 10 having an upper platen 14 and a lower platen 16. Although not shown, it is understood that conveyor rails pass completely through thermoforming machine 10 for conveying a heated sheet of thermoformable material there through during a forming operation from an upstream end on the left to a downstream end on the right. Thermoforming machine 10 has a differential load source, or servo actuated shut height (SASH) mechanism (not shown) that imparts an upward differential load to raise lower platen 16 when platens 14 and 16 are closed together during a forming operation. An upper platen drive assembly 18 cyclically drives upper platen 14 down and up while a lower platen drive assembly 20 drives lower platen 16 up and down in synchronization within a rigid steel frame 12. Upper platen drive assembly 18 has a servo motor that is configured to drive an upper gear box that drives a cross shaft to reciprocate toggle shafts 28 and 30, and upper platen drive assembly 24 via reciprocation of platen drive toggle shafts 28 and 30 to raise and lower upper platen 14. Upper toggle assembly 24 includes a crank arm, a drive arm or link, a connecting link or follower arm, and crank arms, and four connecting rods 44 driven up and down via reciprocating (rotating to and fro) toggle shafts 28 and 30.

Likewise, a lower toggle assembly 26 is configured with a servo motor to drive a lower gear box that drives a cross shaft to reciprocate lower platen drive assembly 26 which reciprocates toggle shafts 32 and 34 (see FIG. 4) to raise and lower platen 16. Lower toggle assembly 26 includes a shaft crank arm, a drive arm or link, a connecting link or follower arm, and crank arms, and four connecting rods driven up and down via reciprocating (rotating to and fro) toggle shafts 32 and 34 (see FIG. 4).

A pair of vertical die guide posts (not shown) guide platens 14 and 16 for vertical reciprocation via respective guide bushings provided on each side of platens 14 and 16. Guide posts are removed from views below in order to facilitate viewing of other components of machine 10.

Figure 2:
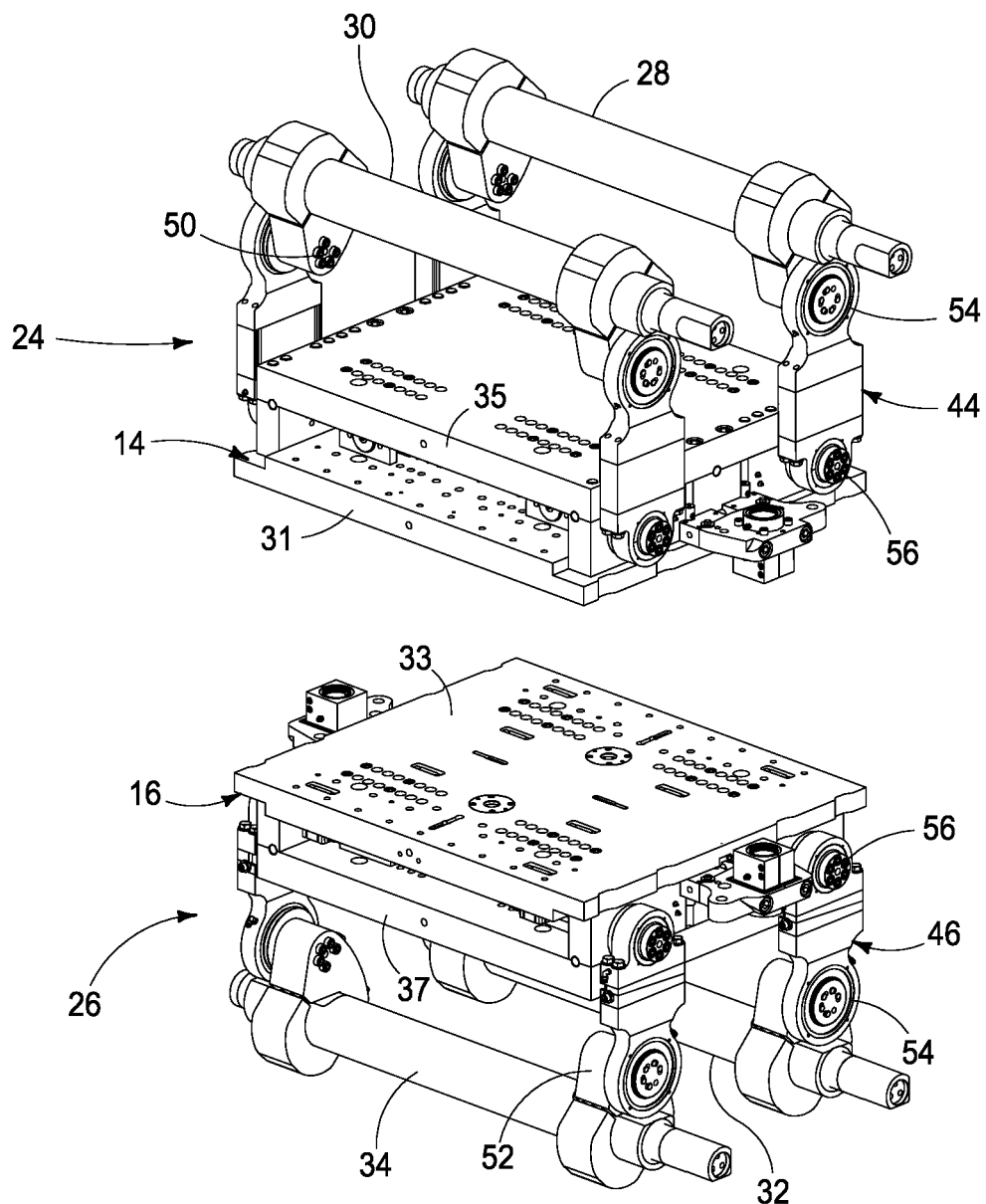
FIG. 2 is an enlarged downstream component perspective view of the platens and platen drive assemblies of FIG. 1.
Figure 3:
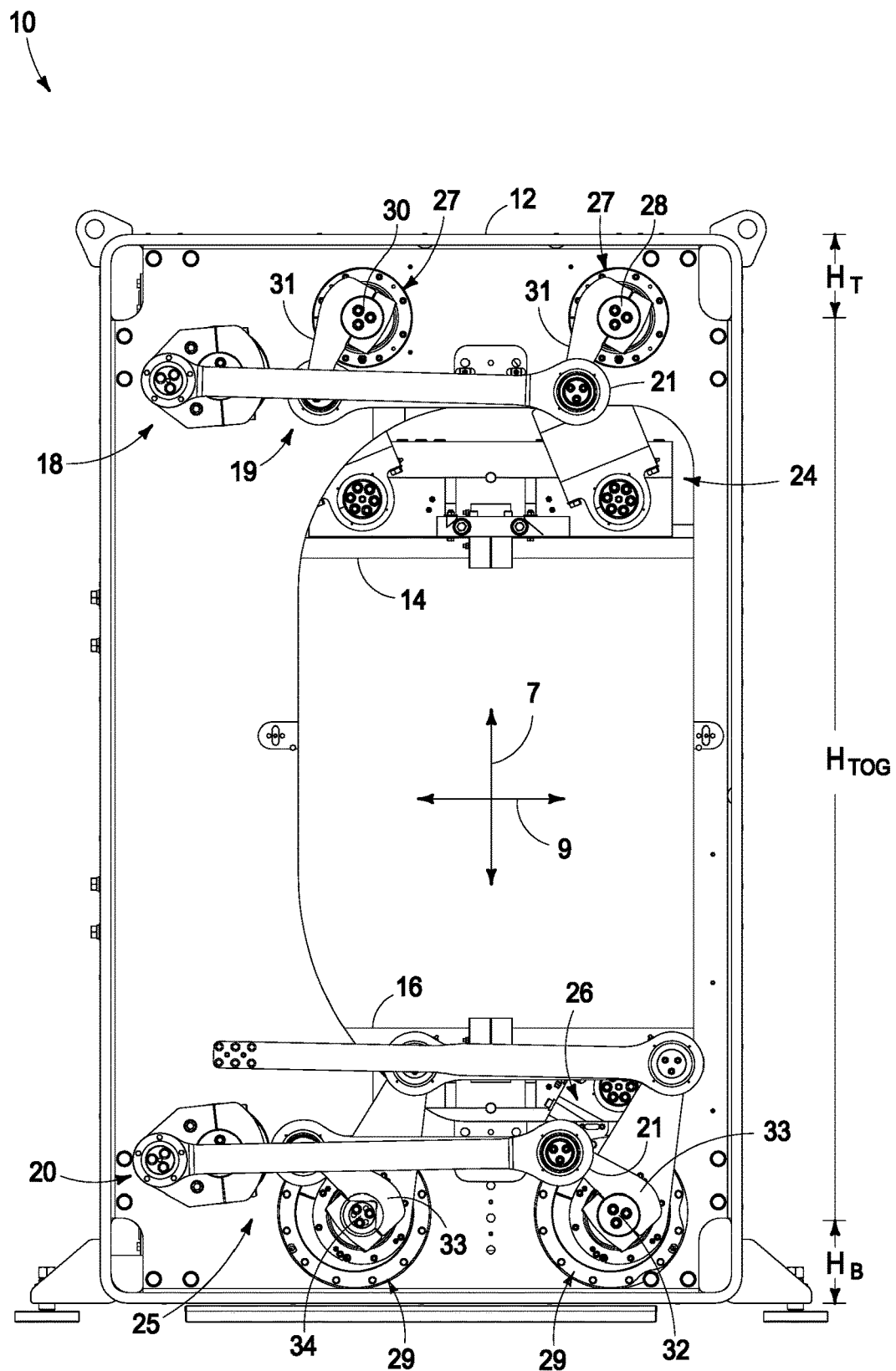
FIG. 3 is a left-side view of the thermoforming machine of FIG. 1 showing the platens in a separated, or open position.

FIG. 2 illustrates thermoforming machine 10 with top platen 14 and bottom platen 16 shown in a closed position carried for reciprocating motion by frame 12. Upper platen 14 includes a tooling support plate 31 configured to support a die plate (not shown) with a plurality of female dies. Likewise, lower platen 16 includes a tooling support plate 33 configured to support a die plate (not shown) with a plurality of complementary male dies, as is understood by one of ordinary skill in the art. The toggle shafts 28, 30 and 32, 34 (see FIG. 4) oscillate to and fro in bearing assemblies 27 and 29 (see FIG. 3) to drive pivot drive links 44 and 46 and move platens 14 and toward and away from each other. As shown in FIG. 2, platen 14 is formed as a compound structure having a leading tooling support plate 31 and a trailing, or back plate 35. Likewise, platen 16 is formed as a compound structure having a leading tooling support plate 33 and a trailing or back plate 37. Plates 31 and 35 of platen 13 and plates 33 and 37 of platen 16 are coupled together with a plurality of discrete load paths interconnecting the tooling plate back surface with the back plate front surface operative to distribute and centralize load deformation of the tooling plate from tooling loads, the load paths provided laterally inboard of the tooling plate front tooling surface to impart discretized and/or localized deformation along the tooling plate front tooling surface. FIG. 3 shows platens 14 and 16 closed in frame 12 of thermoforming apparatus 10.

Figure 8:
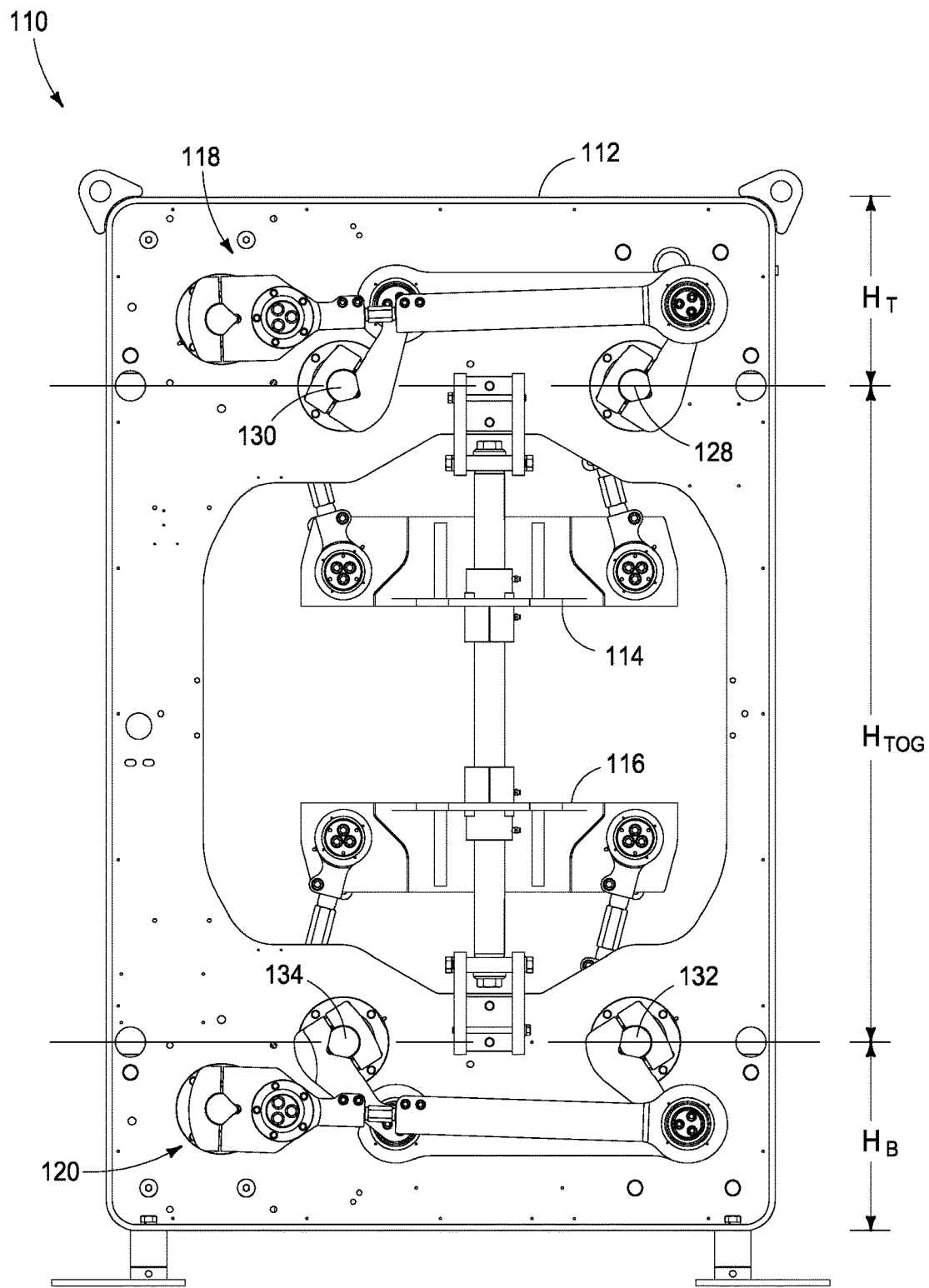
FIG. 8 is a left-side view of a prior art thermoforming machine showing the platens in a separated, or open position and identifying frame height and toggle shaft distance.

FIG. 3 is a left-side view of the thermoforming machine 10 of FIG. 1 showing the platens 14 and 16 in a separated, or open position. More particularly, the upper platen drive assembly 18 and the lower platen drive assembly 20 are configured with toggle shafts 28, 30 and 32, 34 as close as possible to the top surface and bottom surface, respectively, of frame 12. Platen drive assemblies 18 and 20 each include a kinematic drive linkage, or linkage assembly 19 and 25 and a respective drive motor 11 and 13 (see FIG. 1). A drive linkage 31 and 33 is affixed to each respective toggle shaft 28, 30 and 32, 34. The top distance to a centerline of toggle shafts 28 and 30 is designated as "HT" and the bottom distance to a centerline of toggle shafts 32 and 34 is designated as "HB". A remaining distance for the height of frame 12 (excluding feet and lifting rings) is "HTOG". Comparison with the respective distance for prior art thermoforming machine 110 in FIG. 8 shows the manner in which platen open and shut height (distance between tooling surfaces of platens 114 and 116) can be maximized within a given height of a frame 112. This is important because employees are put at risk due to the height of such machines. Furthermore, extra material increases costs for an end product to a customer.

In this way, each platen drive assembly 18 and 20 of FIG. 3 is interposed between the frame 12 and each respective platen 14 and 16, each of the platen drive assemblies 18 and 20 has a drive motor and a toggle linkage having a pair of toggle shafts 28, 30 and 32, 34 carried in the frame 12 and drive arms. Each toggle shaft 28, 30 and 32, 34 is carried respectively in a bearing assembly 27 and 29 by the frame 12 outboard of a distal end of each of the drive arms on the respective platen 12 and 14 relative to the web travel path. Platens 14 and 16 reciprocate along an article forming axis 7 substantially perpendicular to a sheet line axis 9.

Figure 4:
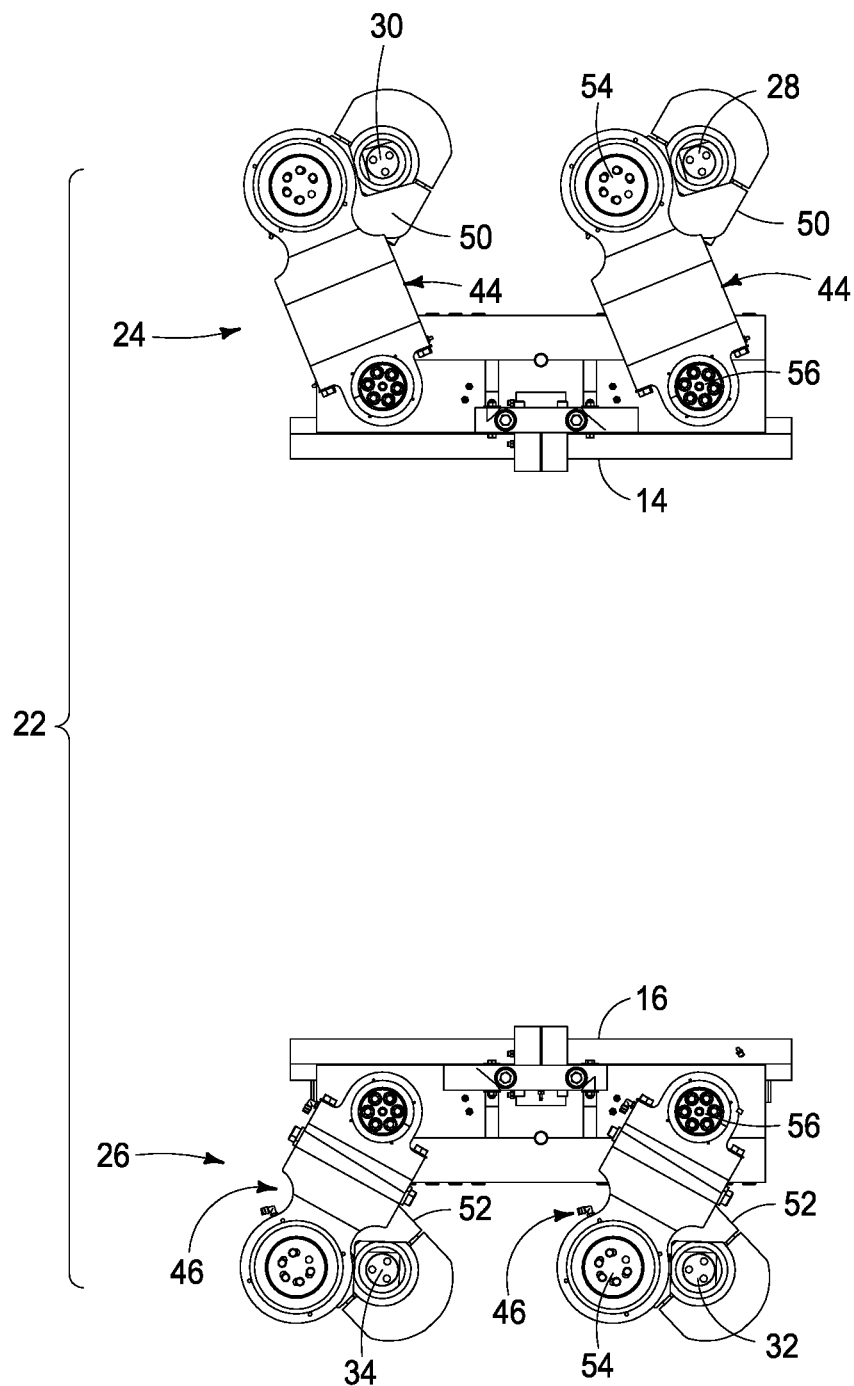
FIG. 4 is a is a left-side view of the top and bottom platens and platen drive assemblies of FIG. 3 showing an open position.

FIG. 4 is a is a left-side view of a sub-assembly 22 including the top and bottom platens 14 and 16 and platen drive assemblies 24 and 26 of FIG. 3 showing an open position corresponding with an open clearance height. Toggle arms 50 on toggle shafts 28 and 30 are shown in such open position with drive arms 44 rotated via bearings 54 and 56 while platen 14 oscillates vertically via platen die posts (not shown), but understood in the art and shown in FIG. 8. Likewise, toggle arms 52 on toggle shafts 32 and 34 are shown in such open position with drive arms 46 rotated via bearings 54 and 56 while platen 16 oscillates vertically via platen die posts (not shown), but understood in the art and shown in FIG. 8.

Figure 5:
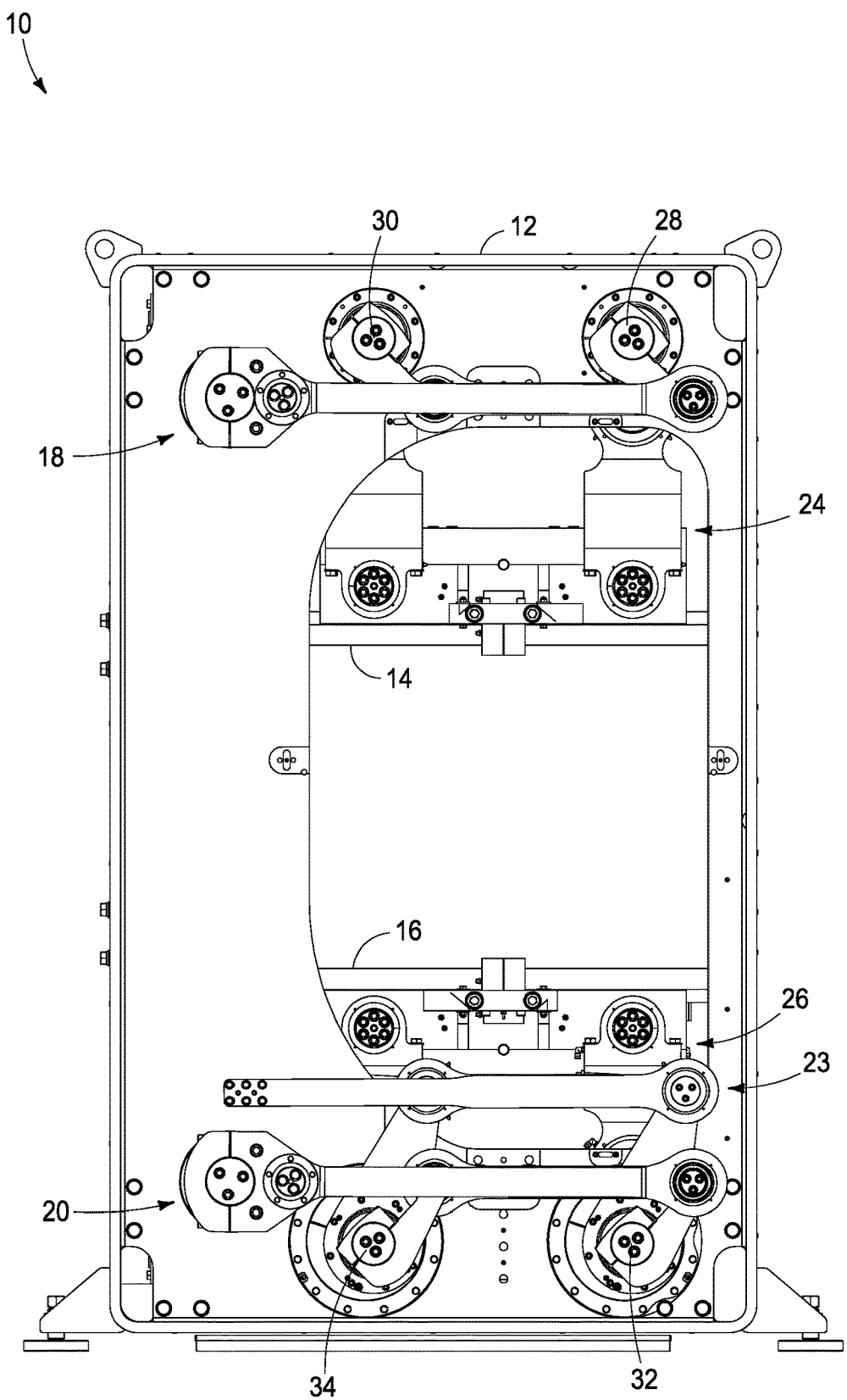
FIG. 5 is a left-side view of the thermoforming machine of FIG. 1 showing the platens in a closed position.

FIG. 5 is a left-side view of the thermoforming machine of FIG. 1 showing the platens 14 and 16 in a closed position. Platen drive assemblies 18 and 20 are shown positioned via their respective servo motors and gearboxes to drive toggle shafts 28, 30 and 32, 34 in reciprocation to their lowered, or closed positions. Kinematic linkage portions of a SASH mechanism 23 are shown in a lowered position before raising platen 16 to counteract effects of forming pressure (and loads) between platens 14 and 16 during an article forming operation. Toggle shafts 28, 30 and 32, 34 are spaced apart as much as possible across a height, or length of frame 12 with drive links on platen drive assemblies 18 and 20 provided inboard, or between pairs of toggle links 28,30 and 32, 34.

Figure 6:
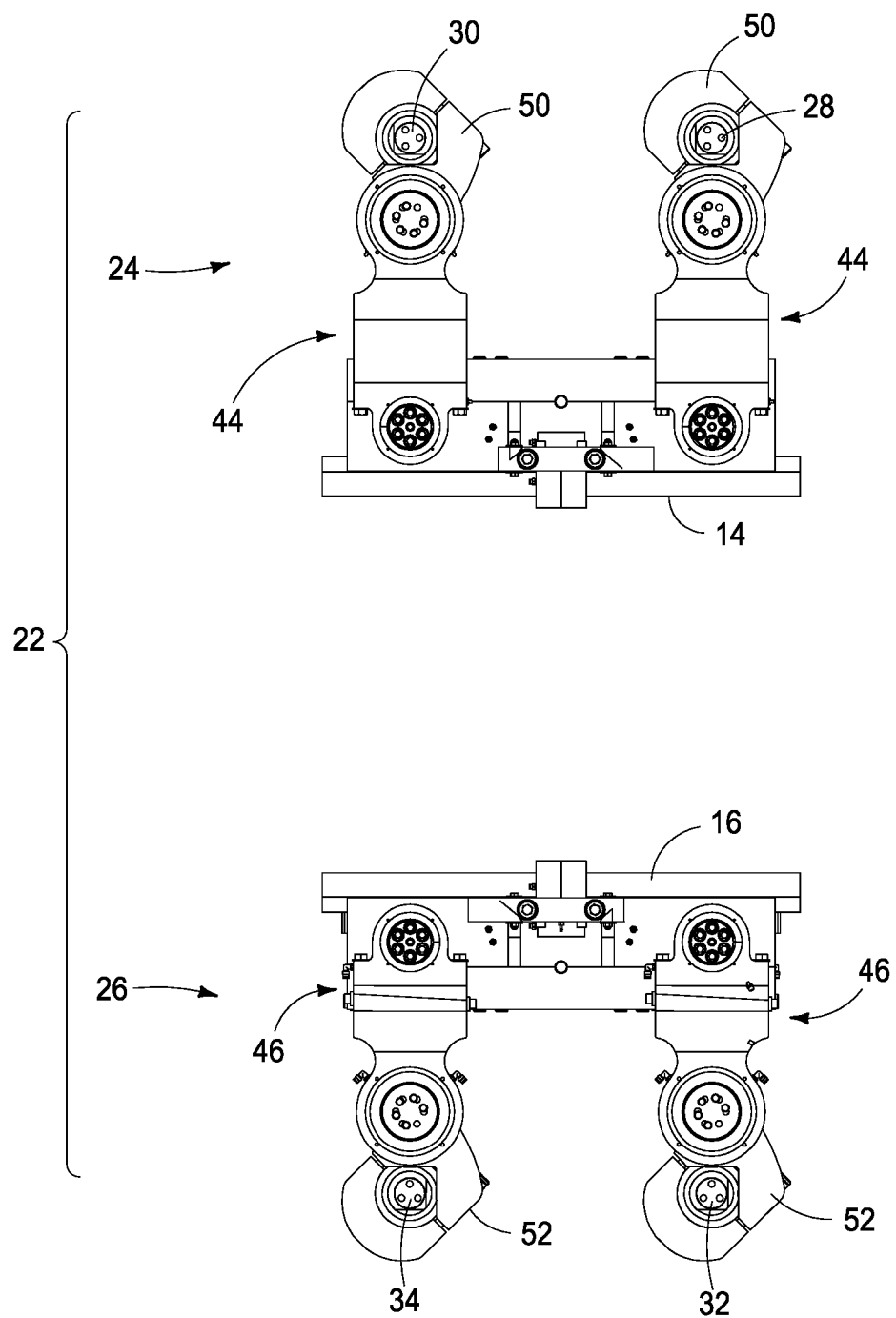
FIG. 6 is a is a left-side view of the top and bottom platens and platen drive assemblies of FIG. 5 showing the platens in a closed position

FIG. 6 is a is a left-side view of a sub-assembly 22 including the top and bottom platens 14 and 16 and platen drive assemblies 24 and 26 of FIG. 5 showing a lowered, or closed position corresponding with a closed, or shut clearance height. Toggle arms 52 on toggle shafts 32 and 34 are shown in such a closed position with drive arms 46 rotated via bearings 54 and 56 (see FIG. 4) while platen 14 oscillates vertically via platen die posts (not shown), but understood in the art and shown in FIG. 8. Likewise, toggle arms 52 on toggle shafts 32 and 34 are shown in such closed position with drive arms 46 rotated via bearings 54 and 56 (see FIG. 4) while platen 16 oscillates vertically via platen die posts (not shown), but understood in the art and shown in FIG. 8

Figure 7:
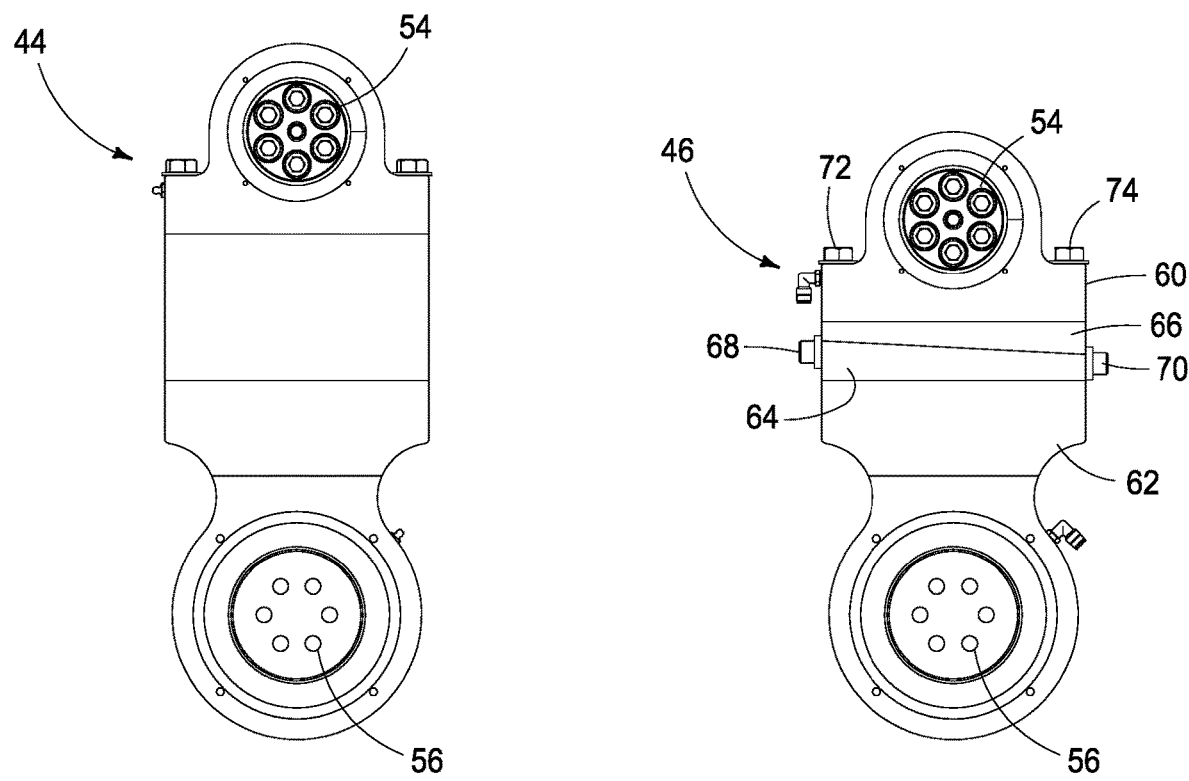
FIG. 7 is a side view of component drive arms for the top and bottom platens.

FIG. 7 is a side view of component drive arms 44 and 46 for the top and bottom platens 14 and 16 (see FIG. 6). Arms 44 drive the upper platen, while arms 46 drive the lower platen in response to reciprocation of respective toggle shafts. Arm 44 is shown with spaced apart bearing assemblies 54 and 56. Arm 46 is shown with bearing assemblies 54 and 56 spaced-apart in an adjustable manner that enables alignment and adjustment of die plate contact surfaces mounted to the respective platens in order to make adjustments that ensure parallel alignment between engaging surfaces and seals provided between a pair of mating die plates on the platens.

More particularly, drive arm 46 of FIG. 7 includes a pair of steel wedges 64 and 66 that adjust relative to one another to adjust cumulative stack height between the wedges to change distance between bearings 54 and 56. Two pairs of laterally spaced-apart bolts 72 and 74 pass through bore holes in body 60 and bores, or slots in wedge 66, elongated slots in wedge 64 and into threaded bores in body 62. Slots in wedge 64 (and in one implementation in wedge 66) enable movement of wedge 64 relative to wedge 66 and bodies 60 and 62 to adjust length of drive arm 46 in order to accurately adjust length of the lower drive arms 46 to ensure even closing about an entire periphery of a pair of mating die plates. A single center bolt 68 passes between bolts 72 while a single center bolt 70 passes between bolts 74 in assembly.

Figure 13:
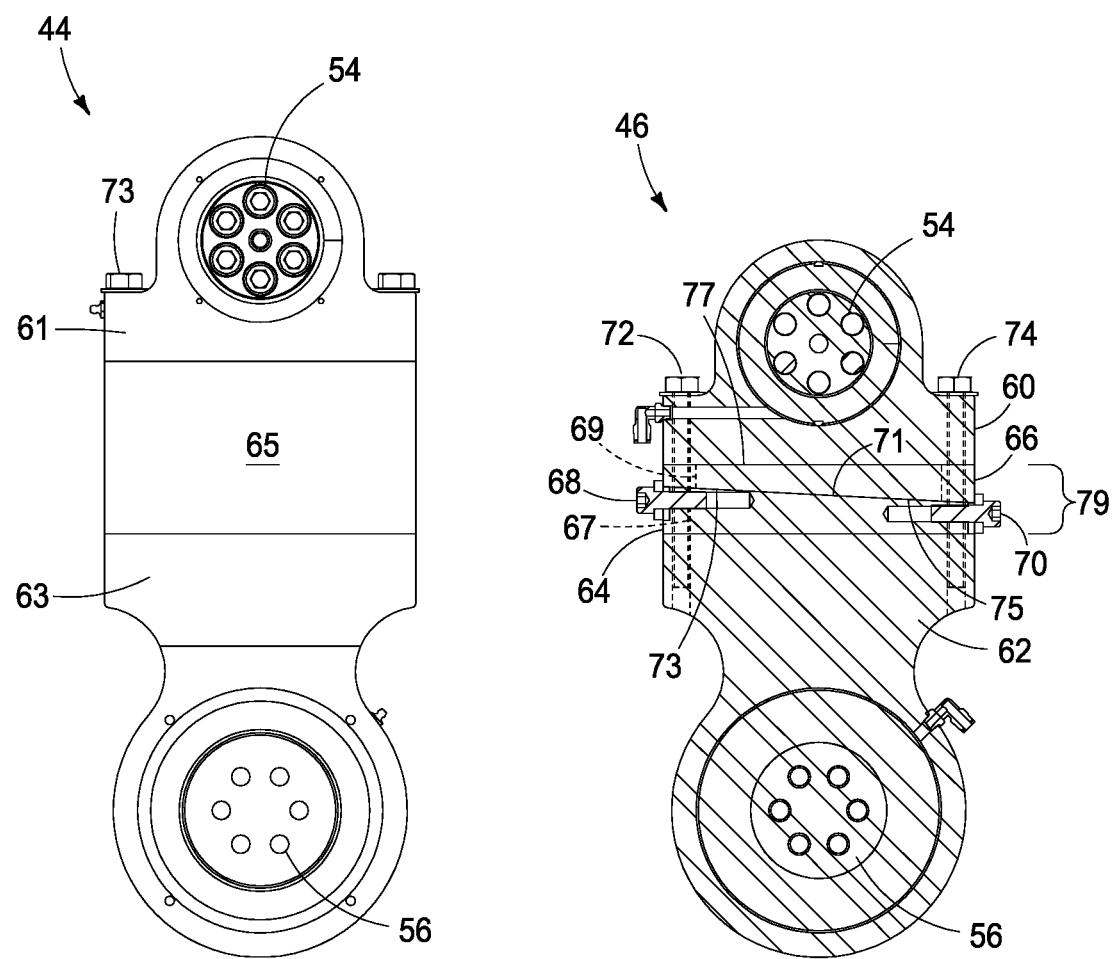
FIG. 13 is a side view of component drive arms for the top and bottom platens with the bottom platen drive arm shown in vertical sectional view.

As shown in FIG. 13, wedge 64 is shorter than a width of bodies 60 and 62 which gives clearance in assembly to move wedge 64 relative to wedge 66 to increase and decrease combined stack height. Bolt 68 is threaded into wedge 64 at a wide end, while bolt 70 is threaded into wedge 64 at a narrow end, as shown in FIG. 13. An enlarged head on bolts 68 and 70 engage on one edge with an adjacent end of wedge 66, and a user can tighten and loosen bolts 68 and 70 to move wedge 66 left and right (as shown in FIG. 13) to lower and raise stack height of wedges 64 and 66. In contrast, drive arm 44 has a single mid-block 65 of defined height which can be replace in a similar manner when changing to die plates having a different thickness. Such feature can be further added to drive arm 46.

FIG. 8 is a left-side view of a prior art thermoforming machine 110 showing the platens 114 and 116 in a separated, or open position and identifying frame height, HT+HTOG+ HB, and toggle shaft distance, HTOG, for frame 112. Frame 112 has a much larger value for HT and HB compared with that shown in FIGS. 3 and 9, which leads to a much larger shut height (see FIG. 12) between platens 14 and 16, as well as open height (see FIG. 10) for a given height of frame 12 compared to prior art thermoforming machine 110 (of FIG. 8). Toggle shafts 128, 130 and 132, 134 are much further away from the top and bottom edges of frame 112 which means machine 110 is required to have a much taller frame size (than machine 10 of FIG. 3) for a given open and shut height for a given pair of platens (to receive a specific depth stack of die plates). As shown in FIG. 8, drive assemblies 118 and 120 are supported by frame 112 above and below, respectively of toggle shafts 128, 130 and 132, 134, which increase total height of frame 112 for a given set of die plates. This increases cost and complexity of the resulting thermoforming machine over the machine depicted in FIGS. 3 and 9.

Figure 9:
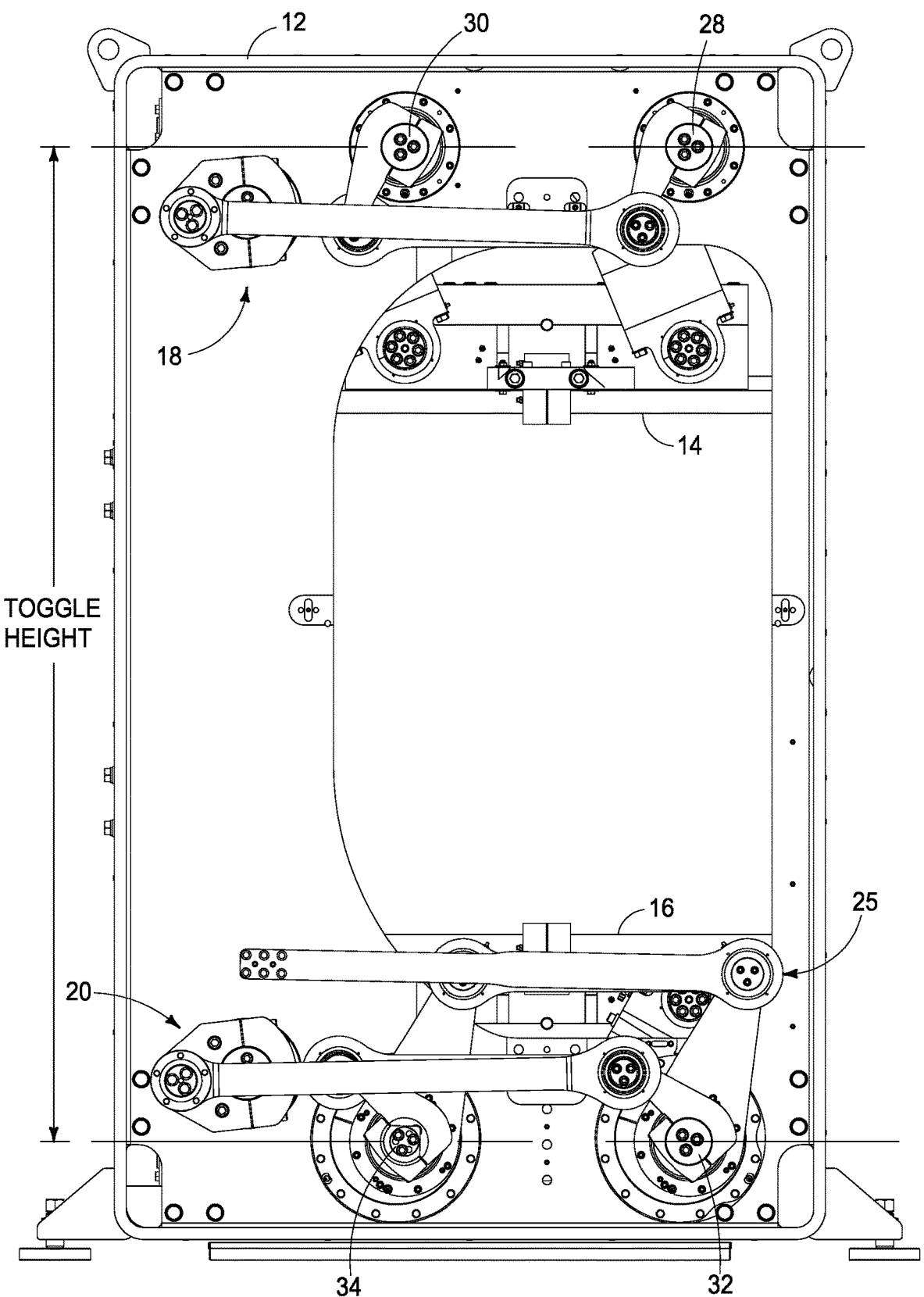
FIG. 9 is a left-side view of the thermoforming machine showing the platens in a separated, or open position and identifying frame height and toggle shaft distance.

FIG. 9 is a left-side view of the thermoforming machine 10 showing the platens 14 and 16 in a separated, or open position and identifying frame height and toggle shaft distance defined by positioning of toggle shafts 28, 30 and 32, 34 in frame 12. In contrast with the design in FIG. 8, platen drive assemblies 18 and 20 are supported by frame 12 below and above, respectively, of toggle shafts 28, 30 and 32, 34, which makes for a more compact configuration of frame 12 and machine 10. Furthermore, auxiliary forming load mechanism, or SASH 23 is also provided above toggle shafts 32 and 34.

Figure 10:
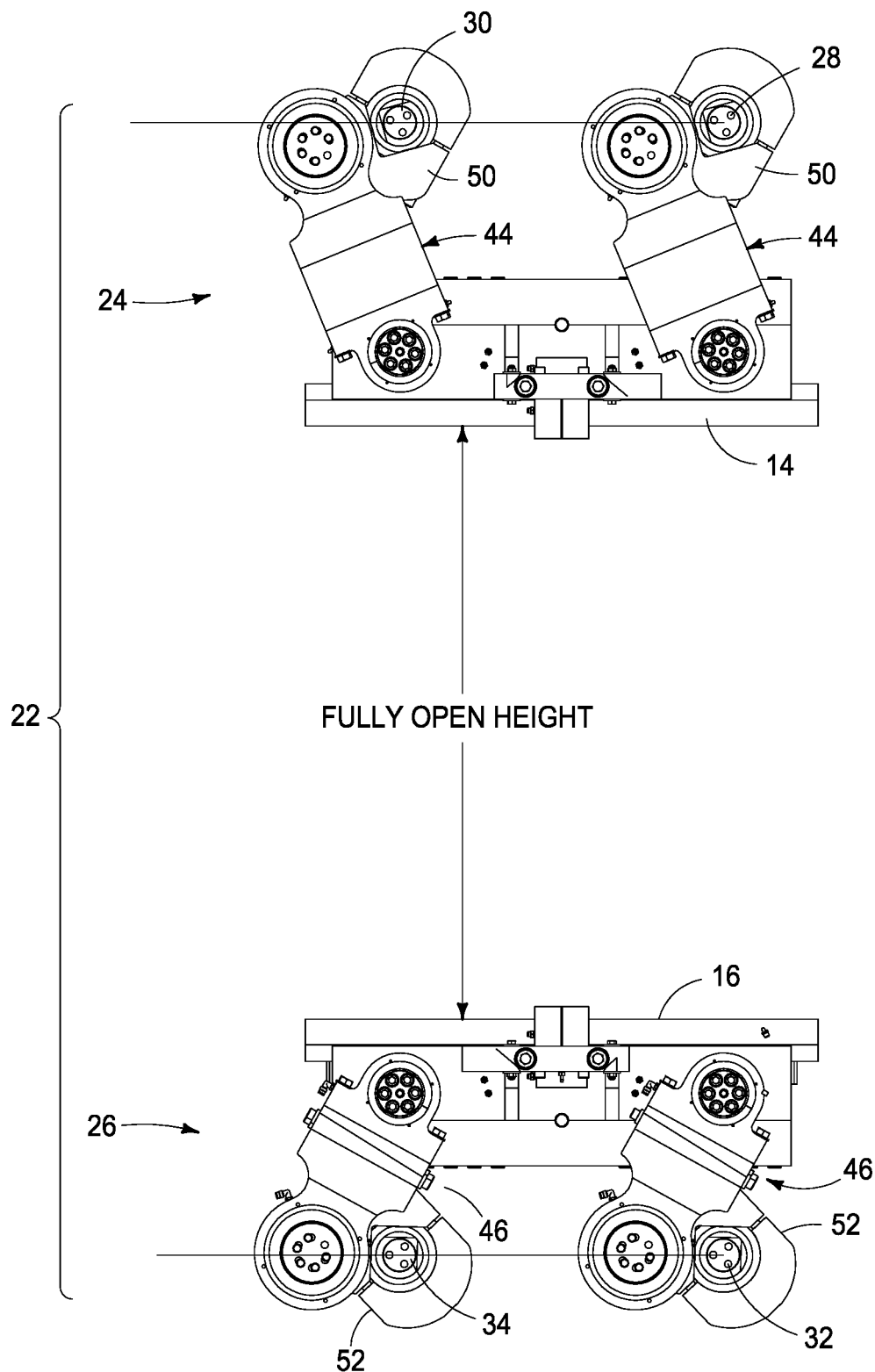
FIG. 10 is a left-side component view of the platens and platen drive assemblies of FIG. 9 shown in a fully open position.

FIG. 10 is a left-side component view of the platens 14 and 16 and platen drive assemblies 24 and 26 of FIG. 9 forming sub-assembly 22 and shown in a fully open height position.

Figure 11:
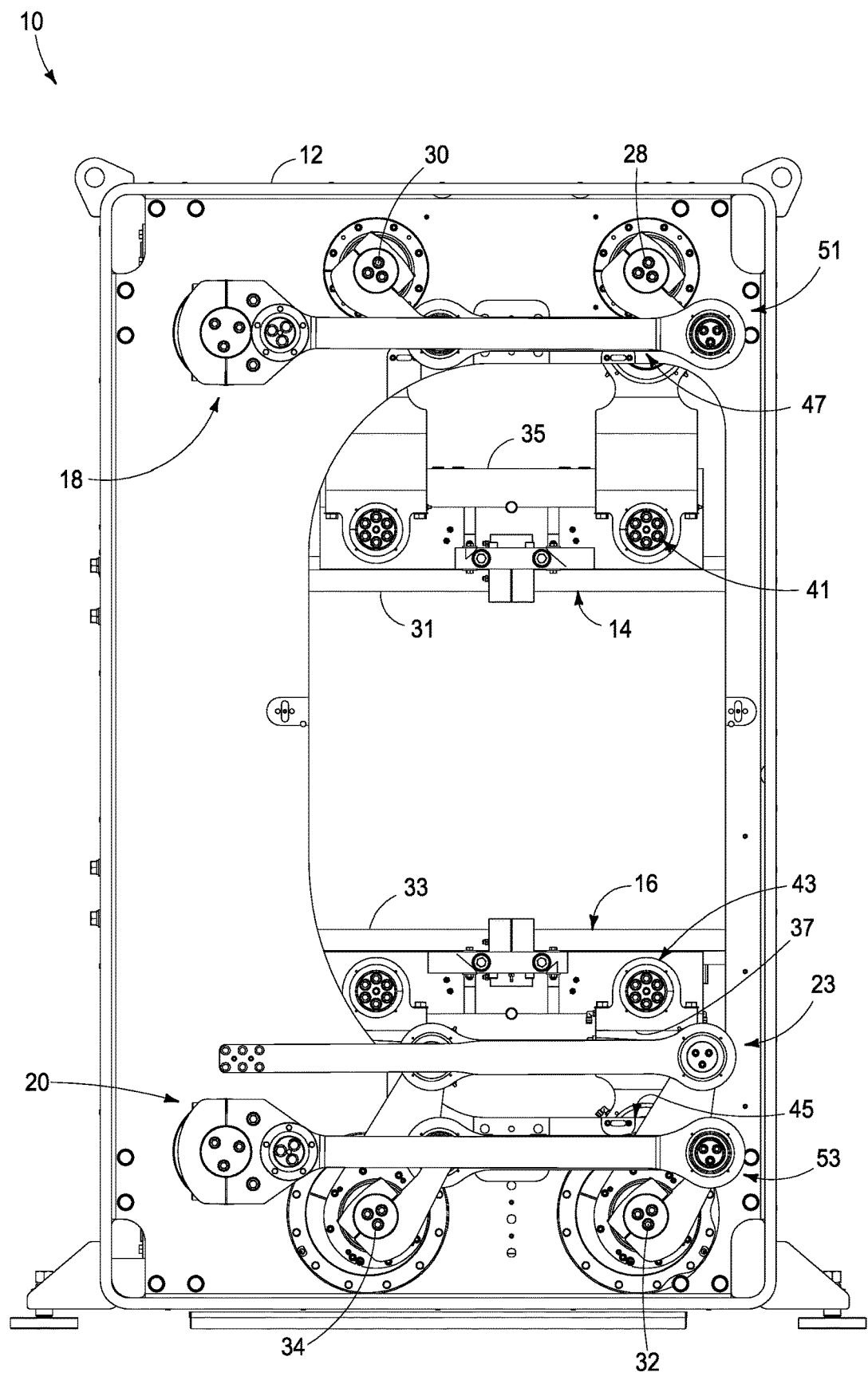
FIG. 11 is a left-side view of the thermoforming machine showing the platens in a closed position and identifying frame height and toggle shaft distance.

FIG. 11 is a left-side view of the thermoforming machine 10 showing the platens 14 and 16 in a closed position and identifying frame height and toggle shaft distance defined by the specific geometry between platen drive assemblies 18 and 20, and placement of toggle shafts 28, 30 and 32, 34 in frame 12. A drive linkage 51 and 53 contains an inboard drive link of each assembly 18 and 20 for each pair of toggle shafts 28, 30 and 32, 34. A SASH mechanism 23 is also provided.

Figure 12:
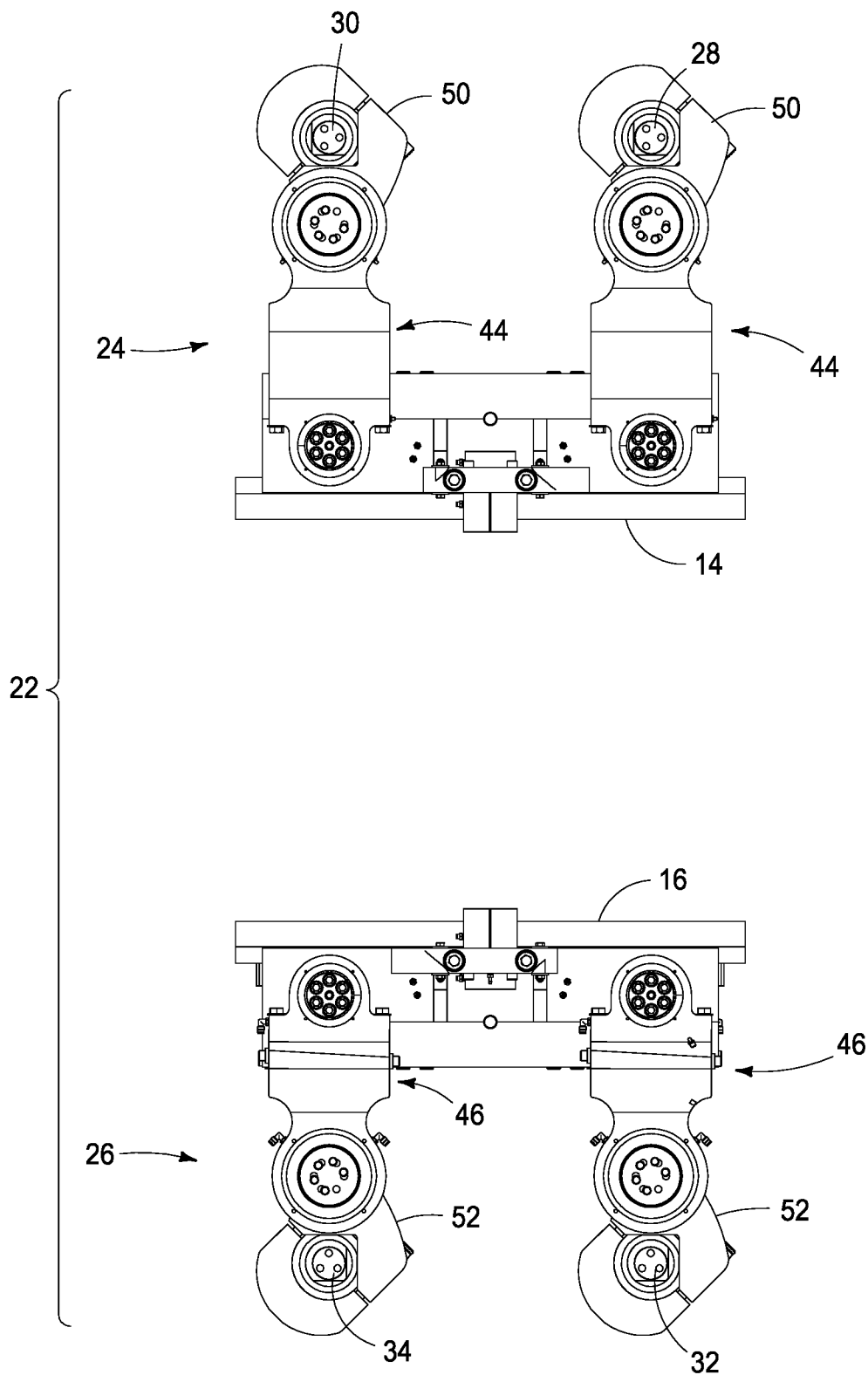
FIG. 12 is a left-side component view of the platens and platen drive assemblies of FIG. 9 shown in a fully closed position.

FIG. 12 is a left-side component view of the platens 14 and 16 and toggle assemblies 24 and 26 of FIG. 9 forming sub-assembly 22 and shown in a fully closed height position. The distance between proximate surfaces of platens 14 and 16 provides a die plate assembly gap for mounting and receiving a pair of mating die platens (with dies). For a given thickness of die plate assembly (or die clearance), such distance is a given and the remaining height of sub-assembly 22 is desired to be made as compact as possible in order to minimize total height of a forming machine using the construction features of the presently described and detailed apparatus. Platen toggles 50 and 52 connect toggle shafts 28, 30 and 32,34 via platen toggle links 44 and 46 to respective platens 14 and 16.

FIG. 13 is a side view of component drive arms 44 and 46 for the top and bottom platens 14 and 16 (see FIG. 12) with the bottom platen drive arm 46 shown in vertical sectional view. Further details were described above in relation to FIG. 7. Drive arm 44 is a fixed length drive arm, whereas drive arm 46 is an adjustable length drive arm. Drive arm 44 has a single rectangular mid-block member 65 of defined height which can be replaced in a similar manner when changing to die plates having a different thickness in order to adjust overall drive arm length. In place of member 65, drive arm 46 has a length, or height adjustable segment, or wedge stack assembly 79 comprising steel wedges 64 and 66. Thickness of wedges 64 and 66 can be adjusted along with member 65 to adjust for different height dies, thereby providing such feature to drive arm 46. Wedge 64 is shorter than a width of bodies 60 and 62 which gives clearance in assembly to move wedge 64 relative to wedge 66 to increase and decrease combined stack height of assembly 79. Bolt 68 is threaded into a threaded bore in wedge 64 at a wide end, while bolt 70 is threaded into a threaded bore in wedge 64 at a narrow end, as shown in FIG. 13. Bolt 68 extends between a pair of laterally spaced-apart bolts 72 and bolt 70 extends between a pair of laterally spaced-apart bolts 74 An enlarged head on bolts 68 and 70 engage on one edge with an adjacent end of wedge 66, and a user can tighten and loosen bolts 68 and 70 to move wedge 66 left and right (as shown in FIG. 13) to lower and raise stack height of wedges 64 and 66. Wedge 64 contains four spaced-apart vertical cylindrical bores, such as bore 67, for receiving bolts 72 and 74 adjacent each of four corners. Such construction fixes wedge atop body 62 and prevents any lateral movement. In contrast, wedge 66 contains four U-shaped slots 69 having a nominal inner diameter for a clearance fit about bolts 72 and 74 which enables wedge 66 to move laterally as bolts 66 and 68 are adjusted (while bolts 72 and 74 are loosened) to realize a desired precise stack height of assembly 79, after which bolts 72 and 74 are tightened.

Assembly 79 of drive arm 46 enables alignment between opposed platens 14 and 16 (see FIG. 12) by adjusting length of the pair of drive arms 46 in order to achieve a desired alignment, or parallelism between such platens. In one case, a thermoforming machine platen alignment apparatus includes a frame, a pair of opposed platens, and a kinematic linkage. The kinematic linkage is configured to support at least one platen for reciprocation to and fro relative to the second platen including a plurality of drive arms pivotally affixed at one end to the platen in a spaced-apart array and at an opposed end with the kinematic linkage. At least one of the drive arms has a length adjustable segment configured to enable parallel alignment between the platens when a pair of mating die plates are affixed to respective ones of the platens. As shown in FIG. 13, drive arm 46 includes an opposed wedge block assembly interposed in the length adjustment assembly configured to lengthen and shorten the drive arm when respectively drawn apart and together. However, it is understood that any of a number of length adjustable structural members could be substituted for co-acting wedges 64 and 66, such as cam surfaces, shims, or other suitable load bearing segments.

Figure 14:
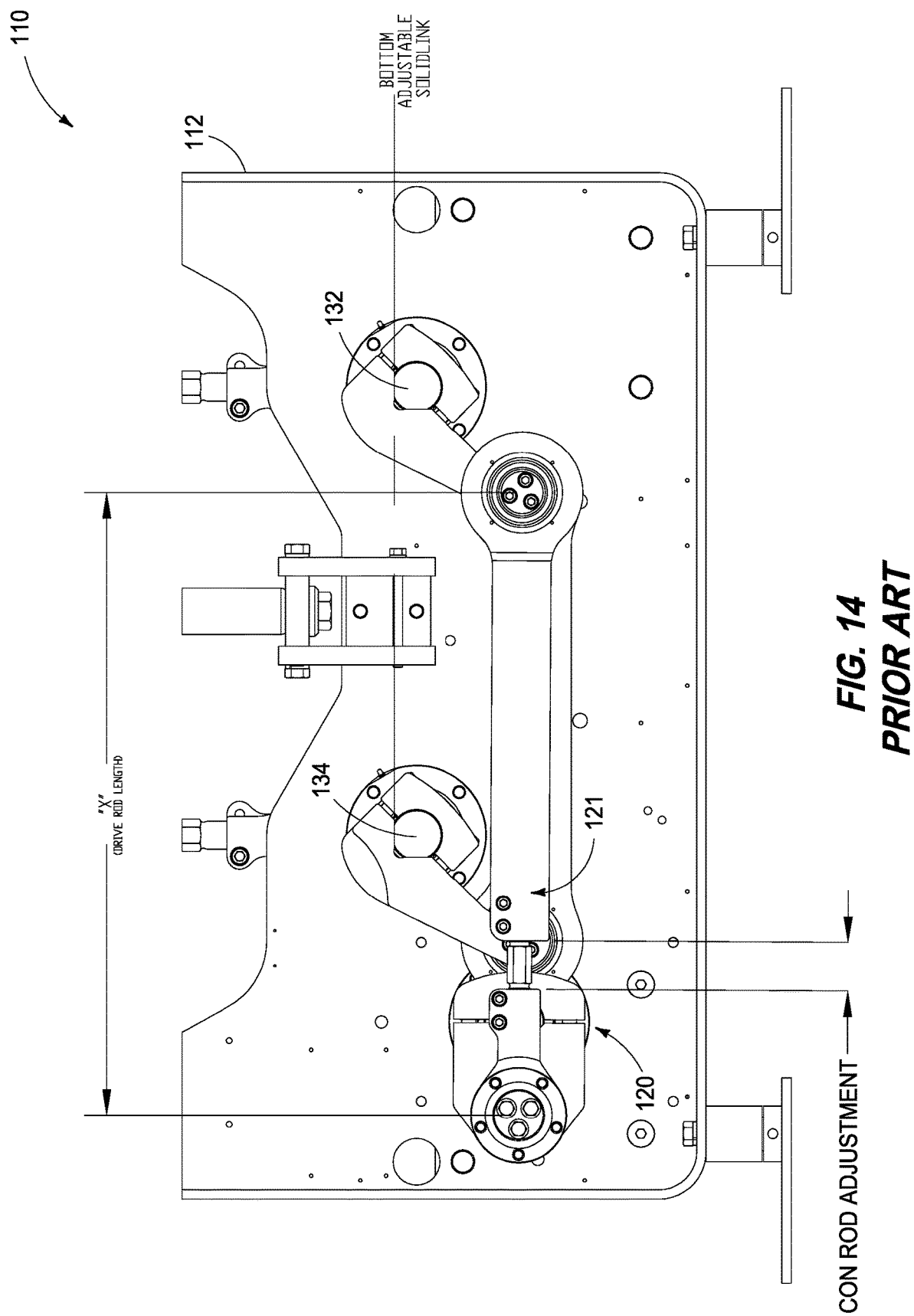
FIG. 14 is a bottom side view of the prior art thermoforming machine of FIG. 8 showing drive linkage and toggle shaft positions in the frame with connecting rod adjustment in a first position.

FIG. 14 is a bottom side view of the prior art thermoforming machine 110 of FIG. 8 showing drive linkage 120 and toggle shaft 132 and 134 positions in the frame 112 with connecting rod 121 adjustment provided in a first position.

Figure 15:
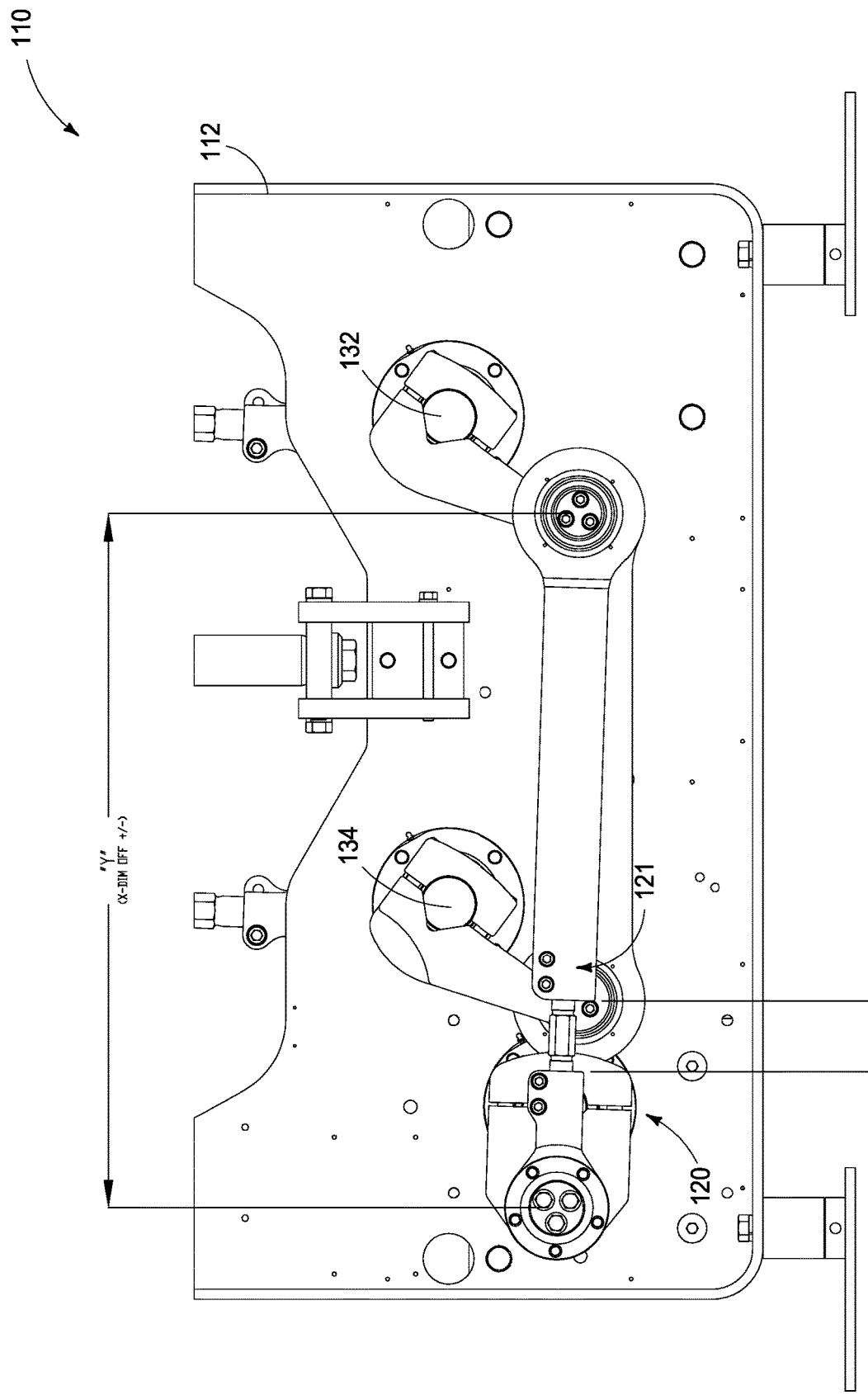
FIG. 15 is a bottom side view of the prior art thermoforming machine of FIG. 8 showing drive linkage and toggle shaft positions in the frame with connecting rod adjustment in a second, adjusted position.

FIG. 15 is a bottom side view of the prior art thermoforming machine 110 of FIG. 8 showing drive linkage 120 and toggle shaft 132 and 134 positions in the frame 112 with connecting rod, or drive link 121 shown in a second, adjusted position.

Figure 16:
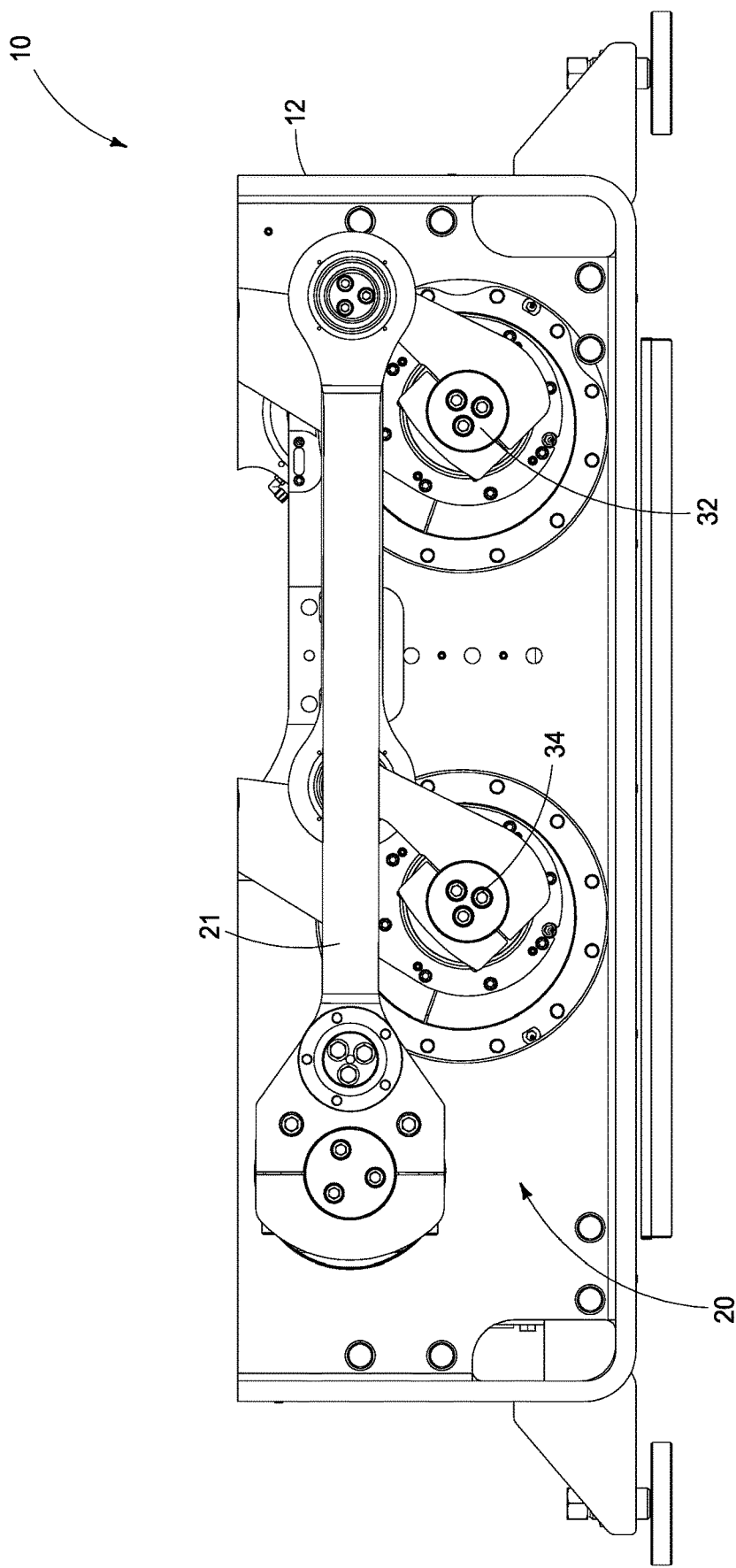
FIG. 16 is a bottom side view of the thermoforming machine of FIG. 1 showing drive linkage and toggle shaft positions in the frame.

FIG. 16 is a bottom side view of the thermoforming machine 10 of FIG. 1 showing drive linkage 20 and toggle shaft 32 and 34 positions in the frame where there is no adjustability in the connecting rod because the length of drive arm 46 (see FIGS. 7 and 13) can be adjusted to implement die surface alignment.

In order to align a pair of co-acting and mating die plates and accompanying upper and lower platens, the platen toggle links, or drive arms 46 of FIG. 13 are adjusted in length by adjusting the threaded depth of fasteners 68 and 70 within wedge 64 to move wedge 64 left or right relative to wedge 66 which adjusts the length of toggle link 46 relative to toggle links 44. More particularly, an operator/tooling set-up employee goes through a series of steps in order to align the platens (and attached die plates). Alignment can be done before installing the die plates to the platens, or it can be done with the die plates installed on each platen.

In a first step, the employee will use an inside micrometer (or equivalent) in order to measure the right-side entrance end gap of a closed platen set (top and bottom) to the left-side entrance end gap of the closed platen set to a tolerance in the range of 0.001 inches or closer. This measurement is done without application of any load or displacement from the SASH. If by such measurement it is not within tolerance, the employee adjusts the SASH offset (left side versus right side displacement from the SASH in elevating the lower platen) in the control system program for the thermoforming machine until they meet tolerance of 0.001 inches or closer at that location between the mating die plates (or accompanying platens).

In a second following step, the employee will measure the exit end right side gap of a closed platen set (top and bottom) and the exit end left side gap of the closed platen set to match the entrance right and left side to 0.001 of an inch. If it is not with in tolerance, the employee adjusts the bolts 68 and 70 on wedges 64 relative to wedges 66 of arms 46 on the exit end only until they meet a tolerance of 0.001 inch or closer.

In a third step, the employee can also use the tool, or die plates (installed) that is going to be used in production on the platens for very close tolerance products because the tool can have wear or dimensional discrepancies. If the employee does not have a tool, they can use an air box (or surrogate spacing tool for a die set space) in order to generate the same force as a tool by applying the form air pressure that will be used in a production environment. This will compensate for all the tolerances of the bearings and machine parts that can wear over time and allow the user or employee to keep the tool to very close tolerances. According to one process implementation, this can be done periodically, such as every 3 months to match maintenance schedules in order to account for any wear and will certify a machine to 0.001 of an inch tolerance. This can impart enhanced precision and accuracy when forming thermoformed articles between a pair of mating die plates and dies.

While the subject matter of this application was motivated in addressing flatness and sealing between die plates when forming using high forming loads, such as loads generated when using forming pressure, or air to help form articles during a thermoforming operation, it is in no way so limited. The disclosure is only limited by the accompanying claims as literally worded, without interpretative or other limiting reference to the specification, and in accordance with the doctrine of equivalents.

The terms "a", "an", and "the" as used in the claims herein are used in conformance with long-standing claim drafting practice and not in a limiting way. Unless specifically set forth herein, the terms "a", "an", and "the" are not limited to one of such elements, but instead mean "at least one".

In compliance with the statute, the various embodiments have been described in language more or less specific as to structural and methodical features. It is to be understood, however, that the various embodiments are not limited to the specific features shown and described, since the means herein disclosed comprise disclosures of putting the various embodiments into effect. The various embodiments are, therefore, claimed in any of its forms or modifications within the proper scope of the appended claims appropriately interpreted in accordance with the doctrine of equivalents.

What is claimed is:

1. A thermoforming apparatus, comprising:
   a frame having a first end and a second end opposed from the first end along an article forming axis and configured to receive a thermoformable sheet transverse to the article forming axis along a sheet line between the first end and the second end;
   a pair of opposed platens, one of the platens carried by the frame proximate the first end of the frame for movement relative to another of the platens carried proximate the second end of the frame, each platen configured to carry a die to form articles in a thermoformable sheet positioned therebetween; and
   a platen drive assembly including:
      a drive motor;
      a kinematic drive linkage coupled with the drive motor having a drive link;
      a pair of toggle shaft bearing assemblies provided in the frame proximate a first end of the frame;
      a toggle assembly having a pair of toggle shafts carried for reciprocation by the pair of toggle shaft bearing assemblies, the pair of toggle shafts provided proximate the one end of the frame and configured to support the one platen relative to the another platen so as to maximize a given die gap between the pair of opposed platens for an existing height of the frame defined between the first end and the second end, the drive link provided inboard of the pair of toggle shafts.

2. The thermoforming apparatus of claim 1, wherein the platen drive assembly includes the pair of toggle shafts each with a pair of spaced-apart toggle arms each coupled in rotation at one end with a respective toggle link and at a distal end of the toggle link with a drive connection adjacent a distal portion of the platen.

3. The thermoforming apparatus of claim 2, wherein the platen drive assembly further comprises a first pair of toggle shaft bearing assemblies provided on one end of each toggle shaft and a second pair of toggle shaft bearing assemblies provided on another end of each toggle shaft, each toggle shaft bearing assembly supported proximate a distal end of the frame.

4. The thermoforming apparatus of claim 3, wherein the distal end comprises one of a top end and a bottom end of the frame.

5. The thermoforming apparatus of claim 1, wherein the another platen has a proximal die surface adjacent the sheet line and a rear surface distal the sheet line.

6. The thermoforming apparatus of claim 5, wherein the platen drive assembly is interposed between the frame and the another platen having another platen drive assembly including another drive motor, another kinematic linkage, a pair of toggle shaft bearing assemblies and a platen toggle drive assembly having a pair of toggle shafts, the another drive motor configured to reciprocate the another platen to and fro relative to the one platen, and the toggle shafts of the another platen mounted on the frame distal to the sheet line and the toggle arms provided proximal to the sheet line in a medial position relative to the toggle shafts.

7. The thermoforming apparatus of claim 6, wherein the another platen drive assembly is configured to have a plurality of toggle arms and toggle links interconnected pivotally together with respective rotation joints and interposed between the frame and the another platen, an outboard-most rotation joint proximate one end of the frame and an inboard-most rotation joint intermediate the rear surface and the proximal die surface of the another platen.

8. The thermoforming apparatus of claim 1, wherein the platen drive assembly comprises the kinematic drive linkage and the drive linkage is configured to reciprocate the toggle shafts in reciprocating rotation via respective drive links.

9. A thermoforming apparatus, comprising:
   a frame having a first end and a second end opposed from the first end along an article forming axis and configured to receive a thermoformable sheet transverse to the article forming axis along a sheet line between the first end and the second end;
   a pair of opposed platens, one of the platens carried by the frame proximate the first end of the frame for movement relative to another of the platens carried proximate the second end of the frame, each platen configured to carry a die to form articles in a thermoformable sheet positioned therebetween;
   a platen drive assembly including:
      a drive motor;
      a kinematic drive linkage coupled with the drive motor having a drive link;
      a pair of toggle shaft bearing assemblies provided in each of a pair of opposed sides of the frame proximate a first end of the frame;

a platen toggle drive assembly having a pair of toggle shafts carried for reciprocation in the pair of opposed sides of the frame by the pair of toggle shaft bearing assemblies, the pair of toggle shafts configured to support the one platen relative to the another platen so as to maximize a given die gap between the pair of platens for an existing height of the frame between the first end and the second end, the drive link provided between the pair of toggle shafts proximate the one end of the frame and a sheet line.

10. The thermoforming apparatus of claim 9, wherein the kinematic drive linkage comprises the drive link pivotally coupled to a respective drive linkage on each of the toggle shafts.

11. The thermoforming apparatus of claim 10, wherein the kinematic drive linkage further comprises the kinematic drive linkage interposed between the drive motor and the toggle shaft.

12. The thermoforming apparatus of claim 11, further comprising the pair of the toggle shafts each pivotally carrying a pair of toggle links spaced apart across the one platen, each toggle shaft spaced across the one platen relative to one another, and each having a pair of the toggle links coupled along a side of the one platen intermediate a front surface and a rear surface of the one platen.

13. The thermoforming apparatus of claim 12, wherein the one platen and the another platen are each supported for reciprocation by the frame together and apart by respective kinematic drive linkages, each having a respective pair of toggle shaft bearing assemblies and a platen toggle drive assembly, and each of the kinematic drive linkages coupled to drive the pair of kinematic linkages and the platens via the connecting link for reciprocation to and fro.

14. The thermoforming apparatus of claim 9, wherein the one platen has at least one side face extending between the front die surface and the rear surface, the outboard-most rotation joint affixed to one side face.

15. The thermoforming apparatus of claim 14, wherein the at least one side face is a rectangular array of four side faces.

16. The thermoforming apparatus of claim 9, wherein the kinematic drive linkage pivotally couples with each toggle shaft via a respective drive linkage.

17. The thermoforming apparatus of claim 16, wherein the drive kinematic linkage platen toggle drive assembly further comprises a pair of toggle links each affixed pivotally to a respective toggle arm at a first end and to a side pivot mount on opposed sides of the first platen.

* * * * *